United States Patent [19]

Oishi et al.

[11] Patent Number: 4,544,975
[45] Date of Patent: Oct. 1, 1985

[54] PAD ASSEMBLY FOR TAPE CASSETTE

[75] Inventors: Kengo Oishi; Masayoshi Moriwaki, both of Kanagawa, Japan

[73] Assignee: Fuji Photo Film Co., Ltd., Japan

[21] Appl. No.: 472,129

[22] Filed: Mar. 4, 1983

[30] Foreign Application Priority Data

Apr. 9, 1982 [JP] Japan .............................. 57-59887[U]
Apr. 9, 1982 [JP] Japan .................................. 57-52362

[51] Int. Cl.⁴ ............................................ G11B 15/60
[52] U.S. Cl. ............................ 360/130.33; 360/130.32; 242/199
[58] Field of Search ............... 360/130.33, 132, 130.31, 360/130.32; 242/199, 197–198

[56] References Cited

U.S. PATENT DOCUMENTS 4,087,845  5/1978  Saito ............................... 360/130.33
4,314,299  2/1982  Ishida et al. ..................... 360/130.33

FOREIGN PATENT DOCUMENTS 2018492  10/1979  United Kingdom ........... 360/130.33

Primary Examiner—John H. Wolff
Attorney, Agent, or Firm—Lucas & Just

[57] ABSTRACT

In a magnetic recording tape cassette, a pad supporting member which supports a tape pad for backing the recording tape against the magnetic head of a recording/reproducing system comprises upper and lower halves. Each half includes a pad supporting portion and a pair of arm portions extending from either side of the pad supporting portion and the halves are connected with each other at the respective free ends of the arm portions with the pad supporting portions being separated from each other by a slit. The upper portion of the pad is bonded to the pad supporting portion of the upper half of the supporting member and the lower portion of the pad is bonded to the lower half, whereby the upper and lower portions can be flexed independently from each other.

2 Claims, 3 Drawing Figures

PAD ASSEMBLY FOR TAPE CASSETTE

BACKGROUND OF THE INVENTION

1. Field of the Invention

This invention relates to an improvement in a magnetic recording tape cassette, and more particularly to an improvement in a tape pad for a magnetic recording tape cassette.

2. Description of the Prior Art

As is well known, a magnetic recording tape cassette such as a compact type tape cassette is provided with a tape pad for backing the recording tape against the magnetic head of a recording/reproducing system. The tape pad is urged toward the recording tape to resiliently press it against the magnetic head when the magnetic head is inserted into the cassette. In an open-reel type tape recorder, the recording tape is brought into intimate contact with the magnetic head by appropriately setting the tape feeding path. However, in the tape cassette where the tape is not drawn out from the cassette, it is difficult to set a tape feeding path suitable for bringing the tape into intimate contact with the magnetic head. Therefore, a tape pad is employed in the tape cassette to bring the tape into intimate contact with the magnetic head.

The tape pad is generally formed of felt and is supported on a resilient leaf spring at the center thereof. Conventionally, the leaf spring is stamped out of a resilient plate member such as of phosphor bronze and is like a cross in its shape, comprising a rectangular central portion to which the felt tape pad is attached and a pair of strip-like arm portions extending from the central portion on either side thereof, each arm portion being narrower than the central portion. The leaf spring is mounted in the cassette so that the arm portions extend substantially in parallel to the recording tape. The conventional cross-like pad supporting member or the leaf spring has a problem in that it is apt to cause uneven wear of the magnetic head. It is difficult to obtain a pad supporting member having a prefectly flat pad supporting surface on the central portion thereof. For example, when the supporting member is stamped out of a resilient plate member, it is apt to deform so that the upper portion and the lower portion thereof are bent in different directions. When the tape pad is attached to the uneven pad supporting surface, the contacting force with which the tape pad is pressed against the magnetic head inherently varies with the portion of the pad. For example, the contacting force at the upper portion of the pad becomes different from that at the lower portion thereof, whereby the magnetic head is unevenly worn. Such unevenness in the contacting force can also be caused when there are manufacturing errors in the measurements of the cassette half on which the pad supporting member is mounted, or when the magnetic head is inserted into the cassette in an incorrect position with respect to the tape pad. In the recording/reproducing system using the cassette, recording and reproducing are generally carried out in two directions of the recording tape. Therefore, the magnetic core of the magnetic head is brought into contact with the recording tape at a position laterally shifted from the longitudinal axis of the tape. Further, the part of the magnetic head other than the magnetic core is more liable to be worn than the magnetic core. Accordingly, if the unevenness in the contacting force of the tape pad is such that the contacting force at such other part of the magnetic head is larger than that at the magnetic core, the difference between the wear at the other part of the magnetic head and the wear at the magnetic core is significantly enlarged.

SUMMARY OF THE INVENTION

In view of the foregoing observations and description the primary object of the present invention is to provide a magnetic recording tape cassette in which the unevenness in the contacting force of the tape pad can be minimized, whereby uneven wear of the magnetic head can be effectively prevented.

The tape cassette of the present invention is characterized in that the supporting member for supporting the tape pad comprises upper and lower halves each comprising a pad supporting portion and a pair of arm portions extending from the pad supporting portion on either side thereof, the upper and lower halves being connected to each other at the free ends of the respective arm portions, the upper portion and the lower portion of the tap pad being attached to the pad supporting portions of the upper and lower halves, respectively. By this arrangement, the difference between the contacting force of the upper portion of the tape pad and that of the lower portion can be minimized since the upper and lower halves of the supporting member supporting the upper and lower portions of the tape pad can be flexed independently from each other.

In a preferred embodiment of the present invention, each half of the supporting member is further provided with a pair of pad retaining projections which extend from opposite sides of the pad supporting portion toward the tape pad to grip the tape pad therebetween, thereby holding the pad against the peeling force exerted onto the pad when the tape runs sandwiched between the pad and the magnetic head.

DESCRIPTION OF THE PREFERRED EMBODIMENTS

Figure 1:
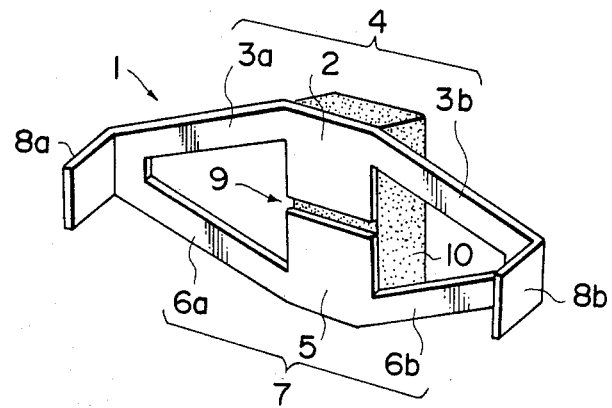
FIG. 1 is a perspective view showing an assembly of the tape pad and the pad supporting member employed in a tape cassette in accordance with an embodiment of the present invention.

FIG. 1 shows a tape pad and a pad supporting member employed in a tape cassette in accordance with an embodiment of the present invention. The pad supporting member 1 comprises upper and lower halves 4 and 7 symmetrically opposed to each other. The upper half 4 includes a pad supporting portion 2 which is rectangular in shape and a pair of upper arms 3a and 3b integrally extending from either side of the pad supporting portion 2. Similarly, the lower half 7 includes a rectangular pad supporting portion 5 and a pair of lower arms 6a and 6b. The upper arm 3a and the lower arm 6a are connected to each other at the free ends thereof, and the upper arm 3b and the lower arm 6b are similarly connected to each other at the free ends thereof. The junctions of the upper arm 3a and the lower arm 6a, and the upper arm 3b and the lower arm 6b are extended and bent in a direction substantially perpendicular to the plane of the arms 3a, 3b, 6a and 6b to form mounting portions 8a and 8b. The supporting member 1 is held in the cassette by securing the mounting portion 8a and 8b to a shield plate, for example. The supporting member 1 may be formed of resilient plate material such as of phosphor bronze, nickel silver or stainless steel.

The pad supporting portion 2 of the upper half 4 and the pad supporting portion 5 of the lower half 7 are separated from each other by a slit 9. The upper portion of a tape pad 10 is bonded to the pad supporting portion 2 of the upper half 4 while the lower portion of the pad 10 is bonded to the pad supporting portion 5 of the lower half 7. The tape pad 10 may be a conventional one which is generally formed of felt.

Figure 2:
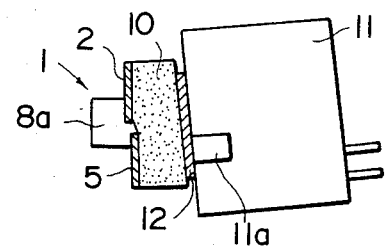
FIG. 2 is a schematic view showing the assembly of FIG. 2 in operation.

FIG. 2 shows the condition in which the cassette of this embodiment employing the arrangement of the pad supporting member 1 and the tape pad 10 shown in FIG. 1 is used with a recording/reproducing system whose magnetic head 11 is inserted into the cassette inclined forwardly with respect to the recording tape 12. In FIG. 2 the tape pad 10 is urged toward the magnetic head 11 by the supporting member 1 to press the recording tape 12 against the magnetic head 11. In this case if the tape pad 10 is supported by the conventional pad supporting member having a pad supporting portion formed of a single plate, the upper portion of the tape pad will be pressed against the magnetic head with a larger force than the lower portion, whereby wear of the upper portion of the magnetic head will be larger than that of the lower portion. However, in the cassette of this embodiment, the contacting force of the upper portion of the tape pad is substantially equal to that of the lower portion even if the magnetic head is inclined with respect to the recording tape or the pad since the upper half 4 of the supporting member 1 supporting the upper protion of the pad 10 can be flexed by a larger amount than the lower half 7 supporting the lower portion of the pad 10. Therefore, the part of the magnetic head 11 above the magnetic core 11a, which is more liable to be worn than the magnetic core 11a, will not undergo excessive wear.

It will be apparent to those skilled in the art that the unevenness in the contacting force of the tape pad due to distortion of the pad supporting portions 2 and 5 of the upper and lower halves 4 and 7, or due to manufacturing errors in measurement of the portion of the cassette for mounting the pad supporting member 1, e.g., the shield plate, can also be substantially nullified by the arrangement of the present invention.

Figure 3:
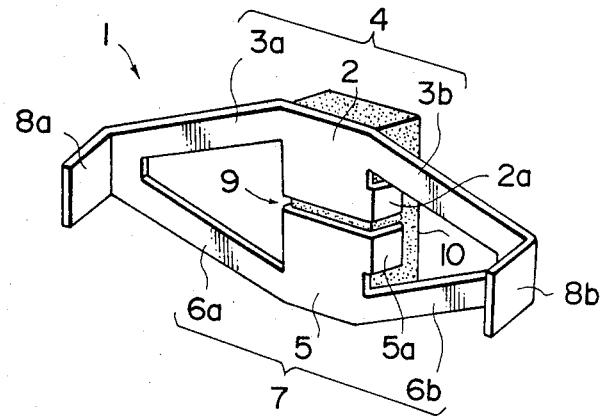
FIG. 3 is a perspective view showing an assembly of the tape pad and the pad supporting member employed in a tape cassette in accordance with another embodiment of the present invention.

Another embodiment of the present invention shown in FIG. 3 is substantially the same as the embodiment shown in FIGS. 1 and 2 except that the pad supporting portion 2 of the upper half 4 and the pad supporting portion 5 of the lower half 7 are provided with a pair of pad retaining projections 2a and 5a, respectively. The pad retaining projections 2a and 5a project toward the tape pad 10 from either side of the respective pad supporting portions 2 and 5 substantially perpendicularly to the plane of the pad supporting portions 2 and 5. Each pair of pad retaining projections 2a or 5a grips the pad 10 therebetween to hold it against the force, exerted by the tape 12 when the tape 12 runs sandwiched between the magnetic head 11 and the tape pad 10, which tends to peel the pad 10 off from the pad supporting portions 2 and 5. Each pair of pad retaining projections may be bent to grip the pad 10 therebetween after the pad 10 is bonded to the pad supporting portions 2 and 5, or may be bent prior to bonding of the pad 10 so that the pad 10 can be forced in between them.

We claim:

1. A pad assembly for a magnetic recording tape cassette wherein a tape pad is supported on a resilient pad supporting member, said pad supportiong member comprising an upper half having an upper pad supporting portion and first and second arm portions extending from either side of the upper part of the upper pad supporting portion, and a lower half having a lower pad supporting portion and first and second arm portions extending from either side of the lower part of the lower pad supporting portion, said first arm portions converging and being connected to each other and said second arm portions converging and being connected to each other, and said upper pad supporting portion and said lower pad supporting portion being separated from each other by a slit; and said tape pad being connected to both the upper pad supporting portion and the lower pad supporting portion.

2. A pad assembly as defined in claim 1 in which each of said upper and lower pad supporting portions is provided with a pair of pad retaining projections on either side thereof, the upper portion of the tape pad being gripped between the pad retaining projections of the upper pad supporting portion and the lower portion of the tape pad being gripped between the pad retaining projections of the lower pad supporting portion.

* * * * *